United States Patent
Solomon et al.

(10) Patent No.: US 9,384,340 B2
(45) Date of Patent: Jul. 5, 2016

(54) ACCESSIBLE REGION OF A DEVICE

(75) Inventors: Mark C Solomon, San Jose, CA (US);
Glenn A Wong, Foster City, CA (US);
April Slayden Mitchell, San Jose, CA (US); Susie Wee, Palo Alto, CA (US);
Ian N Robinson, Pebble Beach, CA (US); Manjirnath Chatterjee, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1198 days.

(21) Appl. No.: 13/037,326

(22) Filed: Feb. 28, 2011

(65) Prior Publication Data

US 2012/0218073 A1 Aug. 30, 2012

(51) Int. Cl.
*G06F 7/00* (2006.01)
*G06F 21/00* (2013.01)
*G06F 21/35* (2013.01)

(52) U.S. Cl.
CPC ........ *G06F 21/35* (2013.01); *G06F 2221/2111* (2013.01); *G06F 2221/2141* (2013.01)

(58) Field of Classification Search
CPC combination set(s) only.
See application file for complete search history.

(56) References Cited

U.S. PATENT DOCUMENTS

| | | | |
|---|---|---|---|
| 2003/0001722 A1* | 1/2003 | Smith | 340/5.61 |
| 2004/0067750 A1* | 4/2004 | Engstrom et al. | 455/411 |
| 2005/0255840 A1* | 11/2005 | Markham | 455/422.1 |
| 2006/0210119 A1* | 9/2006 | Willis et al. | 382/115 |
| 2008/0089277 A1* | 4/2008 | Alexander et al. | 370/328 |
| 2008/0109895 A1 | 5/2008 | Janevski | |
| 2010/0037306 A1 | 2/2010 | Jan | |
| 2010/0077429 A1* | 3/2010 | Kim et al. | 725/37 |
| 2010/0240415 A1* | 9/2010 | Kim et al. | 455/565 |
| 2010/0260388 A1* | 10/2010 | Garrett et al. | 382/124 |

* cited by examiner

*Primary Examiner* — Fekadeselassie Girma
*Assistant Examiner* — Cal Eustaquio
(74) *Attorney, Agent, or Firm* — Norton Rose Fulbright US LLP

(57) ABSTRACT

A device to detect a portable device associated with a user accessing an accessible region of the device with a sensor, identify the portable device and log the user into the device with a profile of the user if the accessible region is accessed by the portable device, and generate a session on the device based on the profile of the user.

19 Claims, 7 Drawing Sheets

ACCESSIBLE REGION OF A DEVICE

BACKGROUND

If a user would like to login into a device, the user can access an input device coupled to the device. The user can use the input device to enter a username and a password. In response to receiving the username and the password from the input device, the device can proceed to authenticate the username and the password. If the username and the password are successfully authenticated, the device can log the user into the device and grant the user access to resources and data on the device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By utilizing a sensor of a device to detect a portable device accessing one or more accessible regions of the device, the device can efficiently determine when the portable device and/or a user associated with the portable device is attempting to gain access to the device. In response to the sensor detecting an accessible region being accessed, the device can receive identification from the portable device. Using the received identification, the device can efficiently and securely identify the portable device and a user associated with the portable device. As a result, sensitive information of the portable device and/or the user is not exposed for another person to view or intercept.

Once the portable device and/or the user have been identified, a profile of the user can be used to efficiently log the user into the device. Using the profile of the user, a session on the device can be generated to include information, applications, and/or configuration settings associated with the user for the user to access and interact with. As a result, a user friendly and personalized experience can be created for the user when the user would like to login and/or gain access to a device with a portable device.

Figure 1:
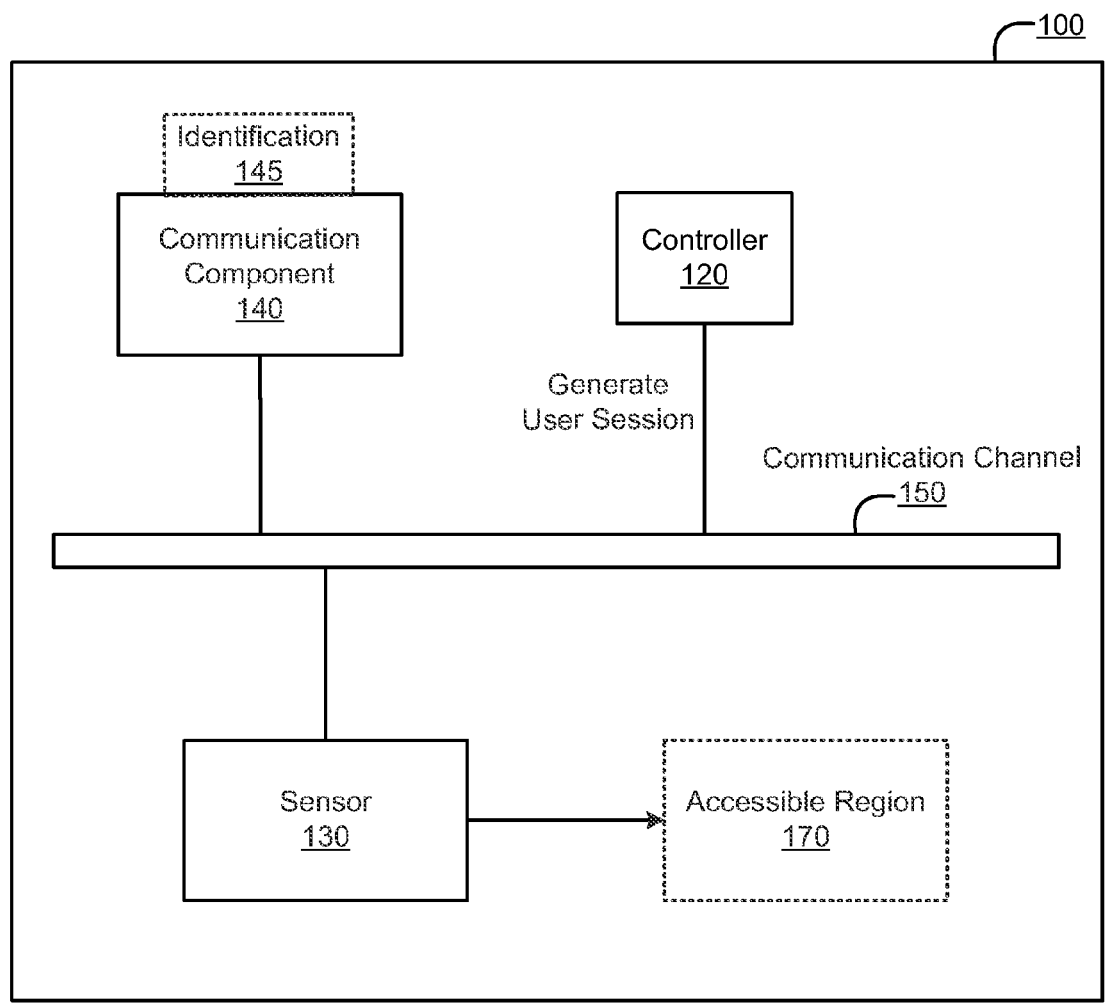
FIG. 1 illustrates a device with a sensor, a communication component, and one or more accessible regions according to an embodiment.

FIG. 1 illustrates a device 100 with a sensor 130, a communication component 140, and one or more accessible regions 170 according to an embodiment. In one embodiment, the device 100 is a desktop, a laptop, a notebook, a tablet, a netbook, a touch system, a touch wall, a large interactive display, an all-in-one system, and/or a server. In another embodiment, the device 100 is or includes a cellular device, a PDA (Personal Digital Assistant), an E (Electronic) Book/Reader, and/or any additional device which can include one or more accessible regions 170.

As illustrated in FIG. 1, the device 100 includes a controller 120, a sensor 130, a communication component 145, and a communication channel 150 for the device 100 and/or one or more components of the device 100 to communicate with one another. In one embodiment, the device 100 additionally includes a login application stored on a storage device coupled to the device 100. In other embodiments, the device 100 includes additional components and/or is coupled to additional components in addition to and/or in lieu of those noted above and illustrated in FIG. 1.

As noted above, the device 100 includes a controller 120. The controller 120 can send data and/or instructions to the components of the device 100, such as the sensor 130, the communication component 140, and/or the login application. The controller 120 can also receive data and/or instructions from components of the device 100, such as the sensor 130, the communication component 140, and/or the login application.

The login application is an application which can be utilized in conjunction with the controller 120 to log a user into the device 100. The user can be any person which can access the device 100 utilizing a portable device. The portable device can be a cellular device, a PDA (Personal Digital Assistant), an E (Electronic) Book/Reader, a hardware token, a netbook, and/or any additional hand held device associated with the user and utilized by the user to access one or more accessible regions 170 of the device 100.

When detecting a user accessing the device 100, one or more sensors 130 of the device 100 can detect the portable device associated with the user accessing one or more accessible regions 170 of the device 100. For the purposes of this application, a sensor 130 is a hardware component of the device 100 configured to detect one or more locations on the device 100 or a component coupled to the device 100 being accessed by the portable device. An accessible region 170 includes a location, space, and/or area on the device 100 or a component of the device 100 which the portable device can be detected by the sensor 130 to be accessing.

In one embodiment, a sensor 130 can detect the portable device accessing an accessible region 170 by detecting the portable device touching the accessible region 170. In another embodiment, a sensor 130 can detect the portable device accessing an accessible region 170 by detecting the portable device coming within proximity of the accessible region 170. If the portable device is detected to be accessing an accessible region 170, the controller 120 and/or the login application can proceed to identify the portable device and log the user into the device 100 with a profile of the user.

For the purposes of this application, a profile of the user can be a signal or file which includes information associated with the user. In one embodiment, the profile of the user can be received or pushed from the portable device. In one embodiment, the profile of the user can include a unique identification associated with the portable device and/or the user. The controller 120 and/or the login application can use the unique identification from the profile of the user to both identify the portable device and log the user into the device.

In another embodiment, the profile of the user includes a username and/or password instead of the unique identification. The unique identification can be sent separately from the profile of the user by the portable device. If the unique identification is sent separately, the controller 120 and/or the login application can use the unique identification to identify the portable device, while using the username and/or password of the profile of the user to log the user into the device 100. The profile of the user can be received from the portable device, the device 100, and/or from a server coupled to the device 100.

In other embodiments, instead of a unique identification, a username and/or password from the profile of the user can be used to both identify the portable device and to log the user into the device. In response to the user being logged into the device, the controller 120 and/or the login application can use the profile of the user to generate a session on the device 100.

In one embodiment, when generating the session on the device 100, the controller 120 and/or the login application can use user associated information to populate and/or configure the session. The user associated information can include data, applications, and/or configuration settings associated with the user. The user can use the generated session to access data, applications, configuration settings, resources, and/or any additional information associated with the user or accessible to the device 100.

The login application can be firmware which is embedded onto the controller 120, the device 100, and/or the storage device of the device 100. In another embodiment, the login application is an application stored on the device 100 within ROM or on the storage device accessible by the device 100. In other embodiments, the login application is stored on a computer readable medium readable and accessible by the device 100 or the storage device from a different location.

Additionally, in one embodiment, the storage device is included in the device 100. In other embodiments, the storage device is not included in the device 100, but is accessible to the device 100 utilizing a network interface included in the device 100. The network interface can be a wired or wireless network interface card. In other embodiments, the storage device can be configured to couple to one or more ports or interfaces on the device 100 wirelessly or through a wired connection. In a further embodiment, the login application is stored and/or accessed through a server coupled through a local area network or a wide area network. The login application communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

Figure 2:
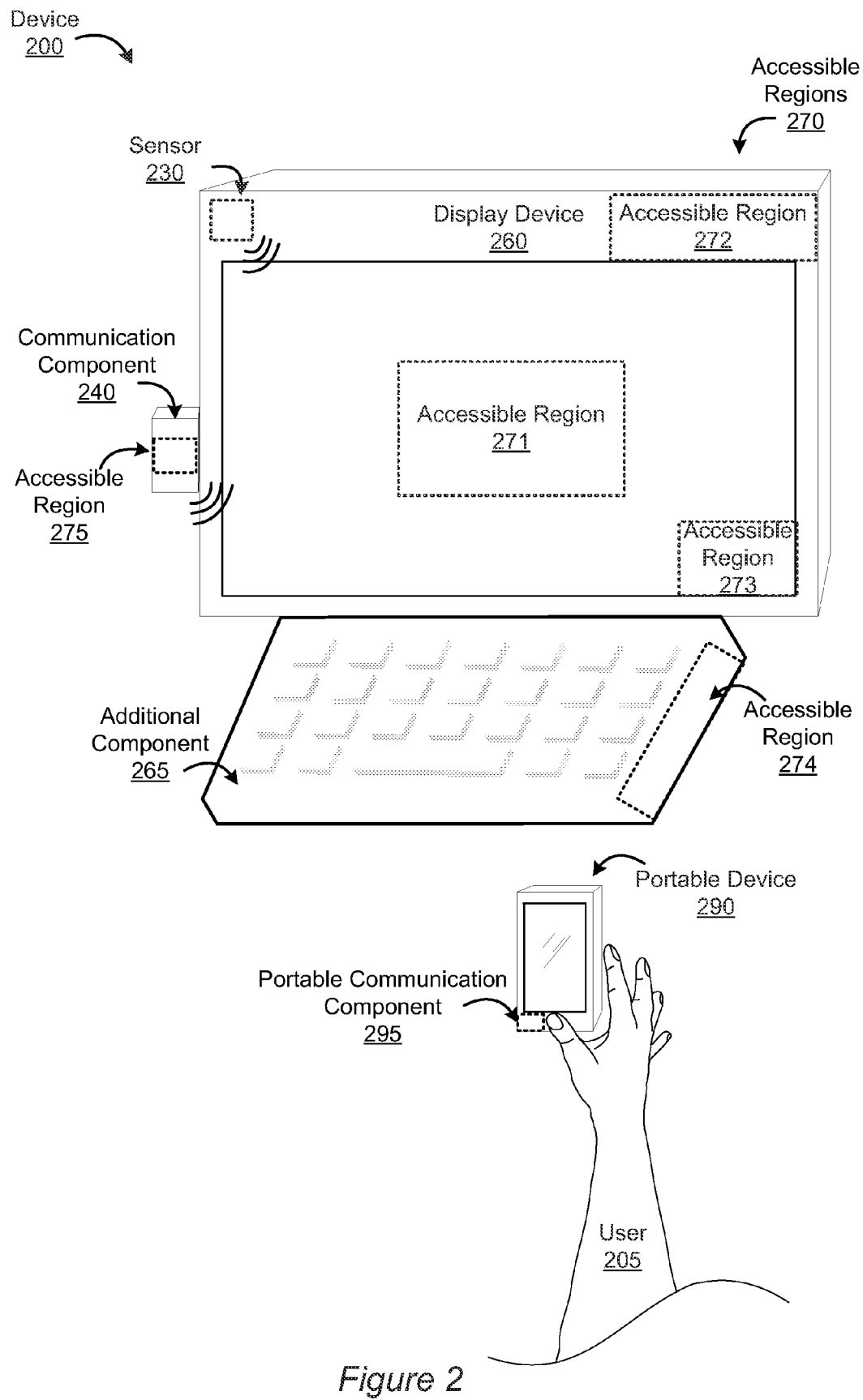
FIG. 2 illustrates one or more accessible regions of a device being accessed by a portable device according to an embodiment.

FIG. 2 illustrates one or more accessible regions 270 of a device 200 being accessed by a portable device 290 according to an embodiment. As shown in the present embodiment, the device 200 can include one or more accessible regions 270 at one or more locations on the device 200 and/or on one or more locations on components coupled to the device 200. As noted above, an accessible region 270 includes a location, space, and/or area which a sensor 230 can detect to be accessed by a portable device 290 associated with a user 205.

A size and/or location of an accessible region 270 can be predefined by a controller and/or a login application of the device 200. In one embodiment, a size of an accessible region 270 can include an entire space or surface of the device 200 and/or a component coupled to the device 200. In another embodiment, a size of an accessible region 270 can include a subset of the space or surface included on the device 200 and/or a component coupled to the device 200. In other embodiments, a size and/or a location of an accessible region 270 can be defined by a user 205.

As shown in FIG. 2, a component coupled to the device 200 can be or include a display device 260, a communication component 240, and/or an additional component 265. A display device 260 is an output component coupled to the device 200 and configured render a user interface if a session of the device 200 is generated for the user 205. In one embodiment, the display device 260 can be integrated as part of the device 200. The display device 260 can be or include a LCD (liquid crystal display), a LED (light emitting diode) display, a CRT (cathode ray tube) display, a plasma display, a projector, a touch wall and/or any additional device configured to render a user interface of a session generated for the user 205.

A communication component 240 is a hardware communication component configured to communicate with the portable device 290 by receiving and/or sending data, signals, and/or files, such as identification and/or a profile of the user from a portable device 290. The communication component 240 can be or include a network interface component, a wireless radio device, a Bluetooth device, an infrared device, and/or any additional communication device configured to receive and/or send data, signals, and/or files.

Further, an additional component 265 can be a hardware input component which can be utilized by the portable device 290 and/or the user 205 to interact with the device 200. In one embodiment, the additional component 265 can be or include a keyboard, a mouse, a touch device, a microphone, an image capture device, and/or any additional component which can be utilized by the portable device 290 and/or the user 205 to interact with the device 200. In other embodiments, the device 200 can be coupled to additional components and/or devices in addition to and/or in lieu of those noted above and illustrated in FIG. 2.

As shown in the present embodiment, a first accessible region 271 can be located at a center position of a screen on a display device 260, a second accessible region 272 can be located at a top right corner of the display device 260, a third accessible region 273 can be located at a bottom right portion of the screen on the display device 260, a fourth accessible region 274 can be located on a side panel of an additional component 265, and a fifth accessible region 275 can be located on a communication component 240 of the device 200. The locations of one or more of the accessible regions 270 can be visible through a marker or indicator located at a corresponding accessible region 270. In other embodiments, the locations of one or more accessible regions 270 are not visible to increase a security of the device 200.

When detecting an accessible region 270 being accessed, one or more sensors 230 can detect corresponding locations of one or more of the accessible regions 270 for a portable device 290 accessing the corresponding location. In one embodiment, one or more sensors 230 can actively or continuously detect for the portable device 290 accessing an accessible region 270. In another embodiment, one or more of the sensors 230 can periodically and/or upon request from a controller and/or the login application detect the portable device 290 accessing an accessible region 270.

As noted above, a sensor 230 can be a hardware component of the device 200 configured to detect the portable device 290 accessing one or more locations on the device 200 and/or one or more locations of components coupled to the device 200. When detecting the portable device 290 accessing a location of the device 200 and/or a component coupled to the device 200, a sensor 230 can detect the corresponding location for the portable device 290 touching the location. In another embodiment, a sensor 230 can detect the corresponding location for the portable device 290 coming within proximity of the corresponding location.

One or more of the sensors 230 can be or include a proximity device, a touch device, an image capture device, a three dimensional depth camera, a time of flight device, a stereoscopic device, a light sensor, and/or any additional device configured to detect for the portable device 290 accessing one or more locations on the device 260 and/or one or more locations on components coupled to the device 100. In one embodiment, one or more sensors 230 can be coupled to and/or integrated to one or more locations on the device 200 or a component coupled to the device 200. In one embodiment, a sensor 230 can be located at a position and/or area where an accessible region 270 is located.

As illustrated in FIG. 2, the portable device 290 can be a hardware device associated with the user 205, which the user 205 can use to access one or more accessible regions 270. In one embodiment, the portable device 290 can be a handheld device, such as a cellular device, a PDA (Personal Digital Assistant), an E (Electronic) Book/Reader, a hardware token, a netbook, and/or any additional handheld device which the user 205 can use to access one or more locations of the accessible regions 270.

In response to a sensor 230 detecting the portable device 290 accessing an accessible region 270, a controller and/or a login application can proceed to identify the portable device 290 and log the user 205 into the device 200. As noted above, when identifying the portable device 290, the controller and/or the login application can utilize an identification and/or a profile of the user 205 transmitted from the portable device 290.

As shown in FIG. 2, the portable device 290 can include a portable communication component 295 configured to transmit a unique identification and/or a profile of the user to the communication component 240 of the device 200. Similar to the communication component 240, the portable communication component 295 is a hardware communication component configured to communicate with the device 200 by receiving and/or sending data, signals, and/or files, such as the unique identification and/or the profile of the user. The portable communication component 295 can be or include a network interface component, a wireless radio device, a Bluetooth device, an infrared device, and/or any additional communication device configured to receive and/or send data, signals, and/or files.

Figure 3A:
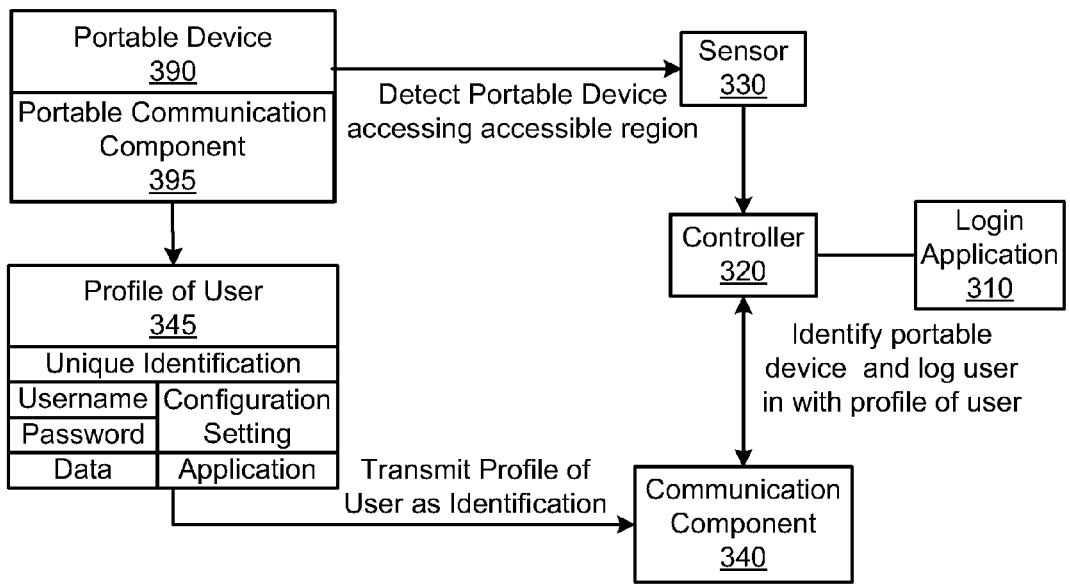
FIG. 3A illustrates a block diagram of a login application identifying a portable device and logging a user into a device according to an embodiment.

FIG. 3A illustrates a block diagram of a login application 310 identifying a portable device 390 and logging a user of the portable device 390 into a device according to an embodiment. As noted above, a profile of the user 345 can be a signal or file accessed by a controller 320 and/or a login application 310 of the device. The profile of the user 345 can be utilized to both identify the portable device 390 and log the user into the device.

In one embodiment, the profile of the user can include a unique identification corresponding to the portable device 390 and/or the user. The unique identification can include a sequence of characters, numbers, images, and/or symbols. In one embodiment, the unique identification can be or include a social security number of the user, an employee ID of the user, and/or a personalized PIN predefined by the user and/or the portable device 390. In other embodiments, the unique identification can include any additional data and/or information in addition to and/or in lieu of those noted above. The unique identification can additionally be encrypted using one or more encryption methods.

In another embodiment, the profile of the user 345 does not include a unique identification. The profile of the user 345 can include a username and/or a password of the user. In other embodiments, the profile of the user 345 can include an application associated with the user, data associated with the user, a configuration setting associated with the user, and/or any additional information associated with the user in addition.

As illustrated in the present embodiment, the profile of the user 345 can be stored and retrieved from the portable device 390. The sensor 330 has detected the portable device 390 accessing an accessible region on the device 300. In response to the sensor 330 detecting the accessible region being accessed, the controller 320 and/or the login application 310 proceed to receive the profile of the user 345 from the portable device 390. As noted above, the portable device 390 can utilize a portable communication component 395 to transmit or push the profile of the user to a communication component 340 of the device.

In one embodiment, the portable communication component 395 can automatically transmit or push the profile of the user 345 in response to the portable device 390 accessing an accessible region on the device. In another embodiment, the portable communication component 395 can transmit the profile of the user 345 to the device in response to receiving a prompt and/or instruction for the portable device 390 to identify itself. In other embodiments, a user of the portable device 390 can manually transmit the profile of the user 345 through the portable communication component 395.

The prompt and/or instruction can be sent by the controller 320 and/or the login application 310 through the communication component 340. In one embodiment, the controller 320 and/or the login application 310 can additionally prompt the portable device 390 for a second identification. In one embodiment, the second identification can include the user utilizing the portable device 390 to access one or more of the accessible regions following a predefined order and/or for a predefined number of times. The predefined order and/or predefined number can be specified by the controller 320 and/or the login application 310 as a password.

In another embodiment, the second identification can include a sequence of numbers, characters, and/or symbols detected from the sensor 330 and/or an input device of the device. In other embodiment, the second identification can include an image and/or fingerprint captured from an input device of the device. Once the second identification has been received and authenticated, the controller 320 and/or the login application 310 can proceed to use the information included in the profile of the user 345 to identify the portable device and log the user into the device.

As noted above, the profile of the user 345 can include a unique identification. In one embodiment, the controller 320 and/or the login application 310 utilize the unique identification to both identify the portable device 390 and log the user into the device. The controller 320 and/or the login application 310 can determine whether the unique identification is recognized and/or authorized. If recognized and/or authorized, the controller 320 and/or the login application 310 can determine that the portable device 390 has been identified and proceed to log the user into the device.

In another embodiment, if no unique identification is received, the controller 320 and/or the login application 310 can access the information included in the profile of the user 345 to retrieve a username associated with the user and a password associated with the user. The controller 320 and/or the login application 310 can determine whether the username associated with the user corresponds to a user account available on the device 300. If the username is associated with a user account of the device 300, the controller 320 and/or the login application 310 can proceed to determine whether the password associated with the user matches a corresponding password used to log the user into corresponding user account.

If a match is found, the controller 320 and/or the login application 310 can determine that the portable device 390 and/or the user has been identified and authenticated. The controller 320 and/or the login application 310 can then log the user into the device 300 with the username and the password and generate a session of the device for the user with the profile of the user 345.

Figure 3B:
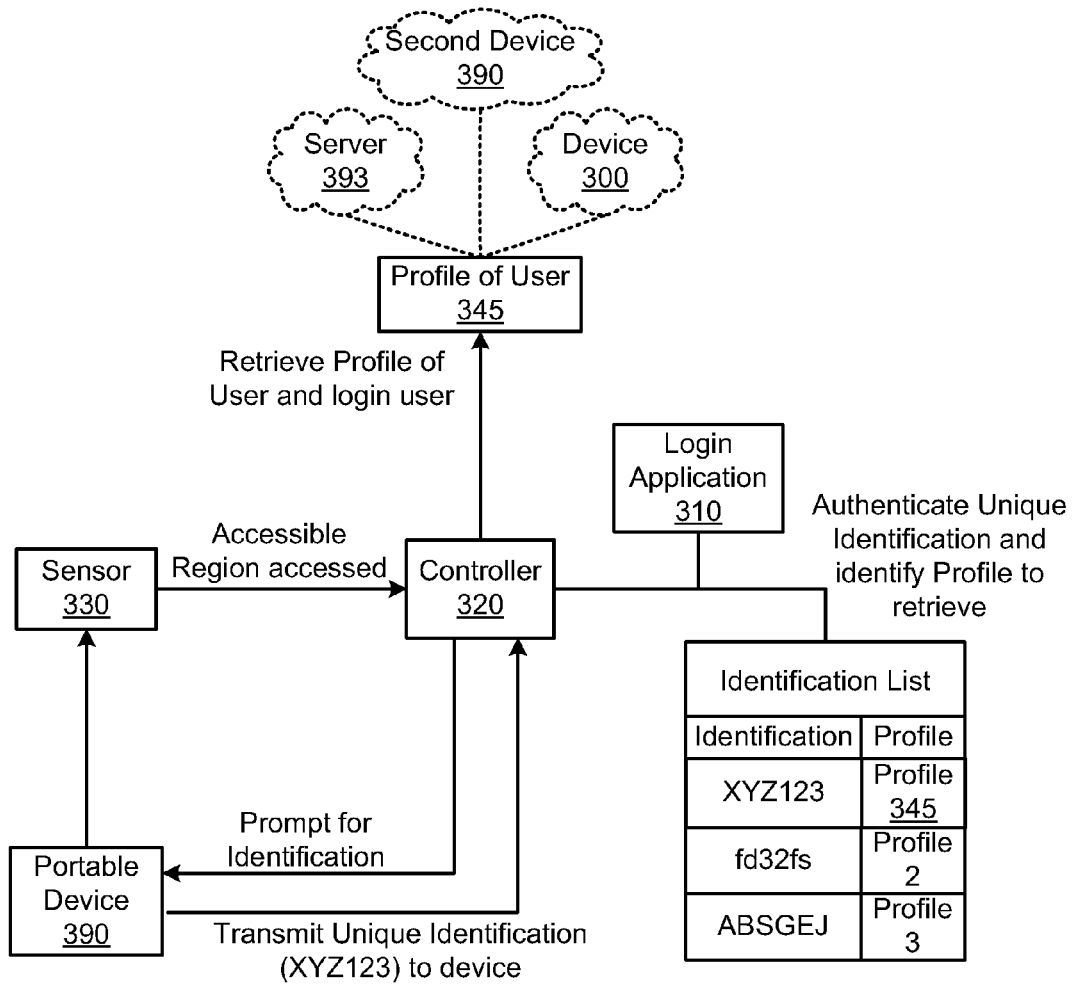
FIG. 3B illustrates a block diagram of a login application identifying a portable device to log a user into a device according to another embodiment.

FIG. 3B illustrates a block diagram of a login application 310 identifying a portable device 390 to log a user into a device according to another embodiment. As noted above, a unique identification can be sent separately from the profile of the user 345 and can be sent separately. If sent separately, the unique identification can be utilized to identify the portable device 390, while the profile of the user 345 can be used to log the user into the device.

As illustrated in FIG. 3B, in response to a sensor 330 detecting a portable device 390 accessing an accessible region, the controller 320 and/or the login application 310 can prompt the portable device 390 for an identification. In response to receiving the prompt, the portable device 390 can proceed to transmit the unique identification to the controller 320 and/or the login application 310. In other embodiments, the unique identification can automatically be sent by the portable device 390 without a prompt from the controller 320 and/or the login application 310.

In response receiving the unique identification, the controller 320 and/or the login application 310 can proceed to determine whether the portable device 390 and/or the user is recognized. In one embodiment, the controller 320 and/or the login application 310 can access an identification list when identifying the portable device 390 and/or the user.

As illustrated in FIG. 3B, the identification list can include one or more entries which list recognized unique identifications and corresponding profiles associated with the unique identifications. The controller 320 and/or the login application 310 can compare the received unique identification to each entry in the identification list and scan for a match. If a match is found, the controller 320 and/or the login application 310 can determine that the portable device 390 and/or the user are recognized and have been identified.

As shown in the present embodiment, the portable device 390 transmits the unique identification (XYZ123) to the controller 320 and/or the login application 310. The controller 320 and/or the login application 310 then scans the entries of the identification list for XYZ123 and finds a match in the first entry. As a result, the portable device 390 and/or the user are determined to be recognized and identified. In response to identifying the portable device 390 and/or the user, the controller 320 and/or the input application 310 proceed to identify profile corresponding with the unique identification.

Because profile 345 is listed to be associated with the user, the controller 320 and/or the login application 310 attempt to retrieve profile 345. As illustrated FIG. 3B, the profile of the user 345 can be stored on the device 300, the portable device 390, and/or on a server 393 accessible to the device 300. In one embodiment, the identification list can list the location where the profile 345 can be retrieved. In another embodiment, the identification received from the portable device 390 can list where the profile 345 can be retrieved.

In other embodiments, the controller 320 and/or the login application 310 can scan the device, the portable device 390 and/or a coupled server for the profile 345. If the profile 345 is not found on the device, the controller 320 and/or the login application 310 can send a query or a prompt for the server 393 and/or the portable device 390 to return the profile of the user 345. Once the profile of the user 345 has been retrieved, the controller 320 and/or the login application 310 can utilize the information included in the profile of the user 345 to log the user into the device 300.

Similar to above, when logging the user into device 300, the controller 320 and/or the login application 310 can retrieve information from the profile of the user 345 and proceed to use a username and/or a password listed in the information to log the user into a user account of the device 300. In another embodiment, the identification can be used as the username for the user account, while the password is retrieved from the profile of the user 345. Once the user has been logged into the device 300, the controller 320 and/or the login application 310 can generate a session for the user.

Figure 4:
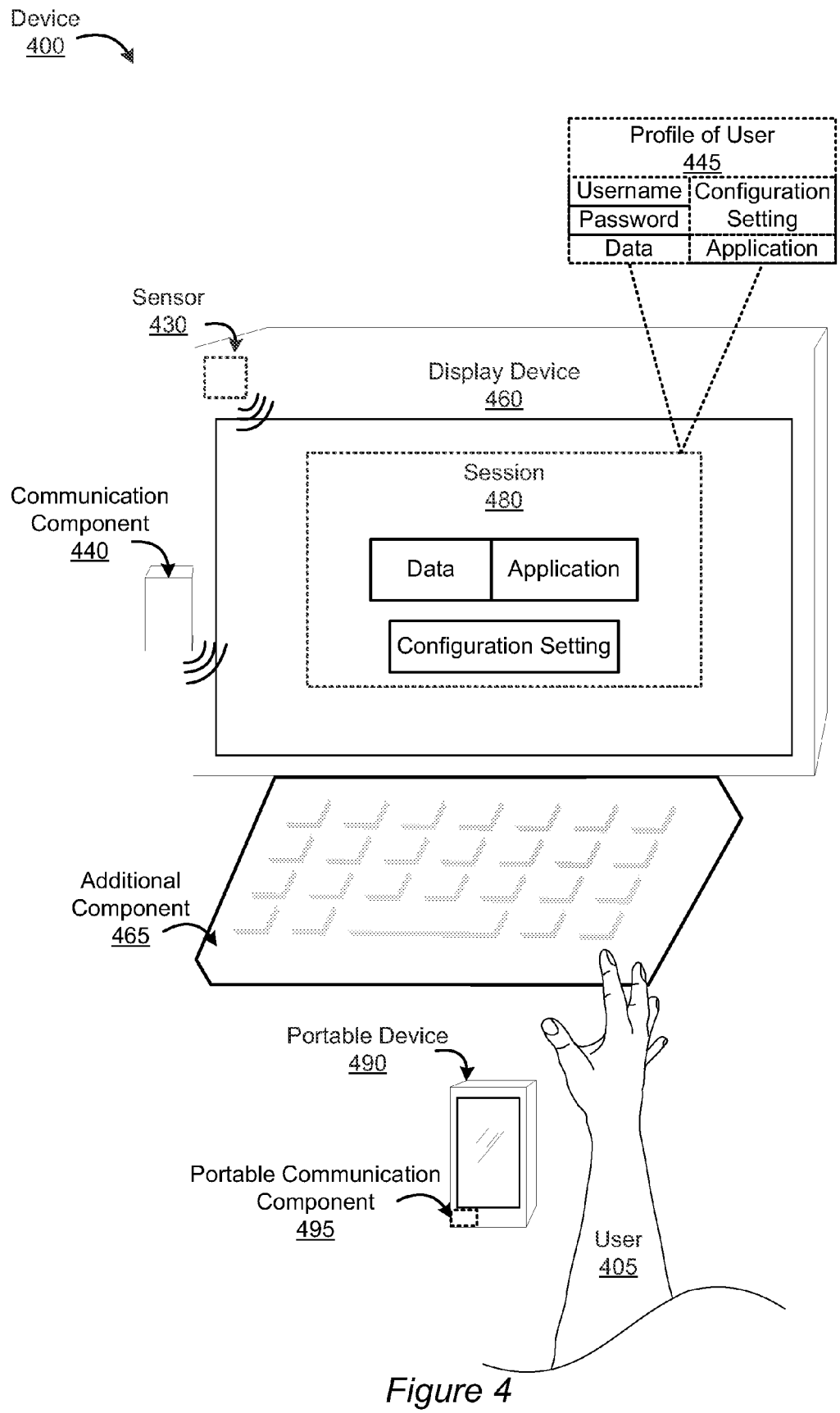
FIG. 4 illustrates a session of a device being generated with a profile of a user according to an embodiment.

FIG. 4 illustrates a session 480 of a device 400 being generated with a profile of a user 445 according to an embodiment. The session 480 can be a user session generated from a user account accessible to the device 400. In one embodiment, the session 480 is a virtual session. Using the session 480, the user can access one or more resources, applications, and/or data accessible to the device 400. One or more of the resources, applications, and/or data can be included in the device 400 or accessible to the device 400 through a communication component 440 of the device 400.

In one embodiment, a controller and/or a login application of the device 400 can also populate and/or configure the session 480 with user associated information from the profile of the user 445. As shown in FIG. 4, the user associated information can include data, applications, and/or configuration settings listed to be associated with the user 405. In one embodiment, the user associated data applications, and/or configuration settings can be stored in the profile of the user 445. In another embodiment, the user associated data, applications, and/or configuration settings can be retrieved by the controller and/or the login application from the portable device 490, a server, and/or another device through the communication component 440.

When populating the session 480, the controller and/or the login application can include the user associated data and/or applications in the session 480. As a result, the user can further access and/or interact with the user associated data and/or applications for a personalized experience. Additionally, the controller and/or the login application can configure the session 480 and/or any of the listed applications or data with one or more user associated configuration settings.

Once the session 480 has been configured and populated with applications and/or data, the session 480 can be generated for the user 405 to access and/or interact with. As shown in the present embodiment, generating the session 480 can include rendering a user interface of the session 480 on the display device 460. The user interface displays one or more applications and/or data associated with the user 405. In one embodiment, if the portable device 490 previously accessed an accessible region on the display device 460, the controller and/or the login application can generate the user interface of the session 480 at the accessed region of the display device 460. When accessing a corresponding application and/or data of the session 480, a sensor 430 of the device 400 can detect the user 405 using the portable device 490 to touch and/or come within close proximity of an application and/or data. In other embodiments, the user 405 can utilize any additional device or interaction method to access and/or interact with the session 480.

Figure 5:
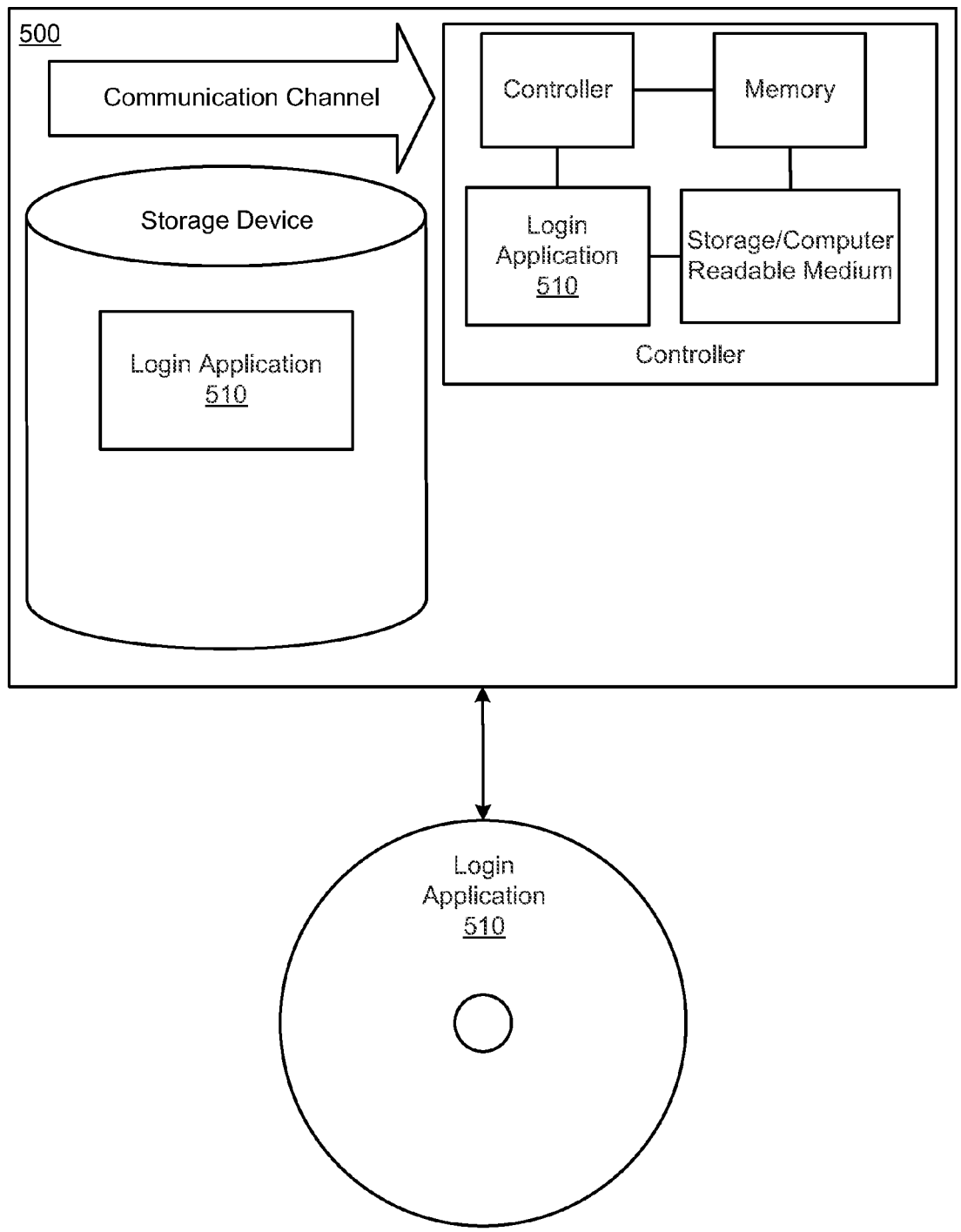
FIG. 5 illustrates a login application on a device and a login application stored on a removable medium being accessed by the device according to an embodiment.

FIG. 5 illustrates a login application 510 on a device 500 and a login application 510 stored on a removable medium being accessed by the device 500 according to an embodiment. For the purposes of this description, a removable medium is any tangible apparatus that contains, stores, communicates, or transports the login application for use by or in connection with the device 500. As noted above, in one embodiment, the login application 510 is firmware that is embedded into one or more components of the device 500 as ROM. In other embodiments, the login application 510 is an application which is stored and accessed from a hard drive, a compact disc, a flash disk, a network drive or any other form of computer readable medium that is coupled to the device 500.

Figure 6:
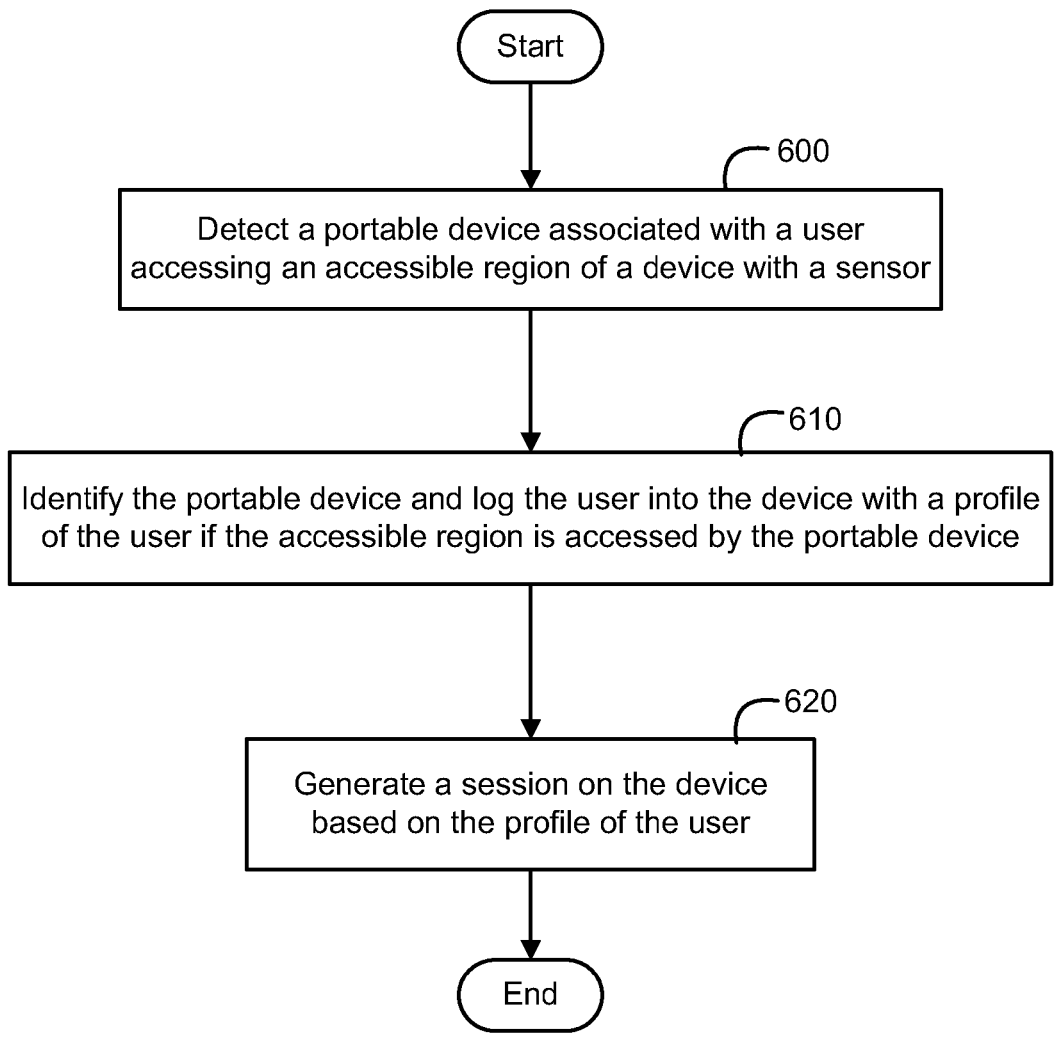
FIG. 6 is a flow chart illustrating a method for logging a user into a device according to an embodiment.

FIG. 6 is a flow chart illustrating a method for logging a user into a device according to an embodiment. The method of FIG. 6 uses a device with a controller, a sensor, a communication component, a communication channel, and/or a login application. In other embodiments, the method of FIG. 6 uses additional components and/or devices in addition to and/or in lieu of those noted above and illustrated in FIGS. 1, 2, 3, 4, and 5.

As noted above, the login application is an application which can be used in conjunction with the controller to log a user into the device. A sensor can initially be used by the controller and/or the login application to detect a portable device associated with the user accessing one or more accessible regions of the device 600. The sensor can be a hardware component configured to detect one or more locations on the device or a component coupled to the device being accessed by the portable device.

An accessible region includes a location, space, and/or area on the device or a component of the device which a portable device can be detected by the sensor to be accessing. A size of the accessible region can include an entire surface of the device and/or a component coupled to the device. In another embodiment, the size of an accessible region can include a portion of the device or a component coupled to the device. Additionally, a location of an accessible region can be visible with a marker and/or indicator. In another embodiment, a location of an accessible region is not visible to increase a security of the device.

When detecting the portable device accessing an accessible region, one or more sensors can detect the portable device touching or coming within proximity of one or more of the accessible regions. The portable device can be a portable and/or handheld device associated with the user. In one embodiment, the portable device can be or include a cellular device, a PDA (Personal Digital Assistant), an E (Electronic) Book/Reader, a hardware token, a netbook, and/or any additional handheld device which the user can use to access one or more locations on the display device.

In response to detecting the portable device accessing an accessible region, the controller and/or the login application can proceed to identify the portable device and log the user into the device with a profile of the user 610. In one embodiment, if the portable device transmits the profile of the user to the device, the profile of the user can be used to identify the device and/or the user. The profile of the user can be a signal and/or a file which includes information associated with the user.

In one embodiment, the profile of the user can include a unique identification corresponding to the portable device or the user. As noted above, the unique identification can include a social security number of the user, an employee identification of the user, and/or a PIN predefined by the user. The unique identification can be utilized by the controller and/or the application to both identify the portable device and to log the user into the device. By identifying the portable device, the controller and/or the login application can determine that the user has additionally been identified.

In another embodiment, the profile of the user does not include a unique identification, but includes a username and/or password. The unique identification can be sent separately by the portable device and be used to identify the portable device. Additionally, the controller and/or the login application can retrieve the profile of the user from the device, the portable device, and/or on a server accessible to the device. If the profile of the user is not stored on the device, a communication component of the device can be used to receive the profile of the user from the portable device and/or the server. The profile of the user can then be used to log the user into the device.

In other embodiments, a unique identification is not used to identify the portable device. The controller and/or the login application can use the username and/or password from the profile of the user to both identify the portable device and log the user into the device. Once logged in, the controller and/or the login application can use the profile of the user to generate a session on the device based on the profile of the user 620. When generating the session, the controller and/or the login application can access user associated information from the profile of the user and include any listed applications, data, and/or configuration settings in the session. In one embodiment, when generating the session, the controller and/or the login application can render a user interface of the session on a display device.

Additionally, one or more configuration settings from the profile of the user can be used to configure the session and/or an application included in the session. The user can use the session to access one or more applications and/or data associated with the user. The method is then complete. In other embodiments, the method of FIG. 6 includes additional steps in addition to and/or in lieu of those depicted in FIG. 6.

Figure 7:
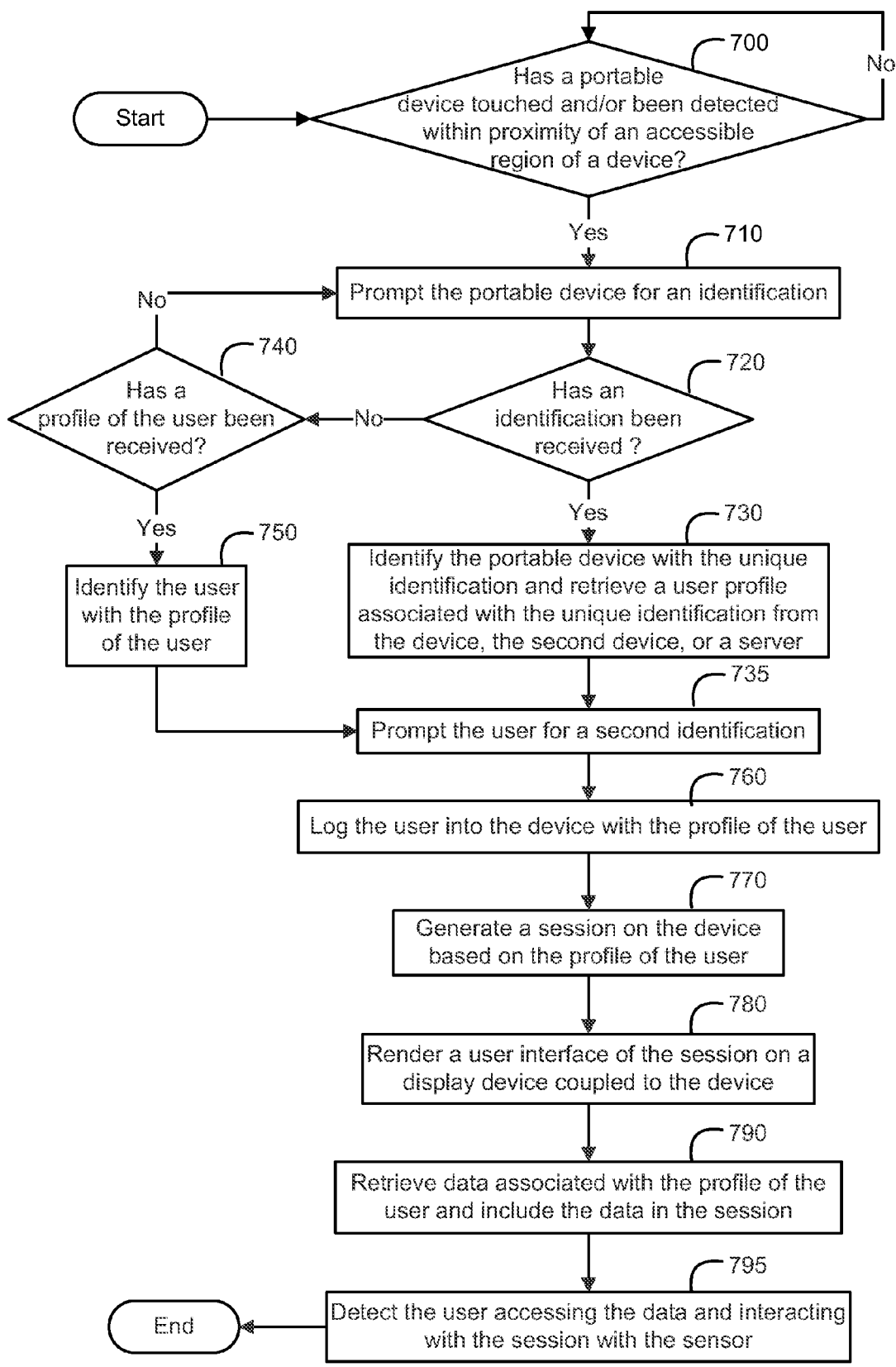
FIG. 7 is a flow chart illustrating a method for logging a user into a device according to another embodiment.

FIG. 7 is a flow chart illustrating a method for logging a user into a device according to another embodiment. Similar to above, the method of FIG. 7 uses a device with a controller, a sensor, a communication component, a communication channel, and/or a login application. In other embodiments, the method of FIG. 7 uses additional components and/or devices in addition to and/or in lieu of those noted above and illustrated in FIGS. 1, 2, 3, 4, and 5.

As noted above, a sensor of the device can initially detect a portable device associated with a user accessing one or more accessible regions of the device by touching and/or coming within proximity of an accessible region 700. If the sensor does not detect the portable device accessing an accessible region, the sensor can continue to detect one or more locations of the device and/or of a component coupled to the device for the portable device touching or coming within proximity of an accessible region 700.

If the sensor has detected the device touching or coming within proximity of an accessible region, the controller and/or the login application can prompt the portable device to identify itself and/or the user 710. As noted above, the user can be any person who can access and/or utilize the portable device. The portable device and/or the user can be identified with a unique identification and/or a profile of the user. In one embodiment, the unique identification can be included in the profile of the user. The unique identification can include a sequence of numbers, characters, images, and/or symbols unique to the user and/or the portable device.

The controller and/or the login application can determine whether a unique identification has been received from the portable device 720. If the unique identification has been received separately or in conjunction with the profile of the user, the controller and/or the login application can proceed to identify and authenticate the portable device and/or the user with the unique identification.

As noted above, when authenticating the portable device and/or the user with the unique identification, the controller and/or the login application can access an identification list and compare the received unique identification to one or more entries in the identification list. Once authenticated, the controller and/or the login application can determine that the portable device and/or the user are identified. The controller and/or the login application can then retrieve a profile of the user from the device, portable device, and/or a server accessible to the device 730. As noted above, the identification list and/or the unique identification can specify where the profile of the user is located.

In another embodiment, if no unique identification of the user was previously received from the portable device, the controller and/or the login application can use a profile of the user to identify the user. The controller and/or the login application can prompt the portable device for a profile of the user if the portable device did not already transmit one and determine whether the profile of the user has been received 740. If no profile of the user has been received from the portable device, the controller and/or the login application can continue to prompt the portable device for an identification of the user and/or a profile of the user 710.

If the profile of the user is received, the controller and/or the login application can proceed to identify the portable device and/or the user with the profile of the user 750. As noted above, the profile of the user can include information associated with the user. The information can be or include a username associated with the user, a password associated with the user, an application associated with the user, data associated with the user, and/or a configuration setting associated with the user.

The controller and/or the login application can utilize the username from the profile of the user to determine whether the username corresponds to a user account of the device. The controller and/or the login application can then proceed to determine whether the password from the profile of the username matches a password to the user account of the device. If the username and/or password match the user account information, the portable device and/or the user will have successfully been identified and authenticated.

In one embodiment, the controller and/or the login application can additionally prompt the portable device and/or the user for a second identification 735. In one embodiment, the second identification can include the user utilizing the portable device to access one or more of the accessible regions following a predefined order and/or for a predefined number of times. The controller and/or the login application can determine whether the accessible regions were accessed following the correct order or if they were accessed the proper number of times. The predefined order and/or predefined number can be specified by the controller and/or the login application as a password.

In another embodiment, the second identification can include a sequence of numbers, characters, and/or symbols detected from the sensor and/or an input device of the device. In other embodiment, the second identification can include an image and/or fingerprint captured from an input device of the device. Once the portable device and/or the user have been identified with the identification, the profile of the user, and/or the second identification, the controller and/or the login application can use the profile of the user to log the user into the device 760.

As noted above, the profile of the user can include a user associated unique identification, username, and/or password which can be utilized by the controller and/or the login application to log the user into the device 760. Once the user has been logged into the device, the controller and/or the login application can generate a session on the device based on the profile of the user 770. When generating the session, user associated information listed in the profile of the user can be used by the controller and/or the login application to populate and/or configure the session. In one embodiment, generating the session includes rendering a user interface of the session on a display device 780.

The controller and/or the login application can retrieve the user associated data, applications, and/or configuration settings from the profile of the user, the portable device, the device, and/or the server to populate and configure the session 790. Once the session has been generated and/or configured, the user can access and/or interact with the applications and/or data associated with the session. When accessing the session, one or more of the sensors can detect the user using the portable device and/or any additional device or method to access and/or interact with the data and/or applications included in the session 795. The method is then complete. In other embodiments, the method of FIG. 7 includes additional steps in addition to and/or in lieu of those depicted in FIG. 7.

What is claimed is:

1. A method for logging a user into a device comprising:
   detecting, by a sensor of the device, a touch of a portable communication device on an accessible region of the device, wherein the portable communication device is associated with a user;
   in response to detecting the touch of the portable communication device on the accessible region, identifying the portable communication device and logging the user into the device using a profile of the user; and
   generating a session on the device based on the profile of the user.

2. The method for logging the user into the device of claim 1 wherein the accessible region comprises a subset of a surface of the device defined for logging the user into the device.

3. The method for logging the user into the device of claim 1 further comprising prompting the portable communication device for an identification in response to the sensor detecting the touch of the portable communication device on the accessible region of the device.

4. The method for logging the user into the device of claim 3 wherein the profile of the user is received from the portable communication device and the device uses the profile of the user to identify the portable communication device and to log the user into the device.

5. The method for logging the user into the device of claim 3 wherein identifying the user includes receiving, from the portable communication device, a unique identification for the device to authenticate.

6. The method for logging the user into the device of claim 5 wherein the device retrieves the profile of the user from at least one of the device, the portable communication device, and a server in response to authenticating the unique identification of the portable device.

7. The method for logging the user into the device of claim 1 further comprising retrieving data associated with the profile of the user from at least one of the portable communication device, the device, and a server to include in the session of the device.

8. The method for logging the user into the device of claim 7 further comprising detecting the user accessing data associated with the profile of the user in the session with the sensor.

9. A device comprising:
    a sensor to detect a touch of a portable communication device on an accessible region of the device, wherein the portable communication device is associated with a user;
    a communication component to receive a profile of the user from the portable communication device if the sensor detects the accessible region being accessed; and
    a controller to identify the portable communication device and log the user into a session of the device using the profile of the user received from the portable communication device;
    wherein the controller generates a session of the device for the user based on the profile of the user.

10. The device of claim 9 wherein an accessible region of the device comprises a subset of a surface of the device defined for logging the user into the device.

11. The device of claim 9 wherein the portable communication device includes a portable communication component to transmit the profile of the user to the device in response to a request from the device.

12. The device of claim 9 further comprising a display device configured to render a user interface of the session of the device based on the profile of the user.

13. The device of claim 12 wherein at least one accessible region is included on the display device.

14. The device of claim 13 wherein the user interface of the session is generated at an accessed region included on the display device.

15. The device of claim 9 further comprising an additional component with at least one accessible region.

16. The device of claim 9 wherein the sensor includes at least one of a proximity device, a touch device, an image capture device, a time of flight device, a stereoscopic device, and a light sensor.

17. A non-transitory computer readable medium comprising instructions that if executed cause a controller to:
    detect a touch of a portable communication device on an accessible region of the device, wherein the portable communication device is associated with a user;
    receive a profile associated with the user from the portable communication device in response to the touch of the portable communication device on the accessible region; and
    identify the user and log the user into a user session of the device using the profile of the user.

18. The computer readable medium comprising instructions of claim 17 wherein the profile of the user includes at least one of a unique identification, a username of the user, a password of the user, a configuration setting associated with the user, an application associated with the user, and data associated with the user.

19. The computer readable medium comprising instructions of claim 17 wherein the controller additionally prompts the user for a second identification in response to the accessible region being accessed.

* * * * *